Sept. 15, 1931.  W. HARGREAVES  1,823,651
SAFETY VALVE
Filed Nov. 5, 1929
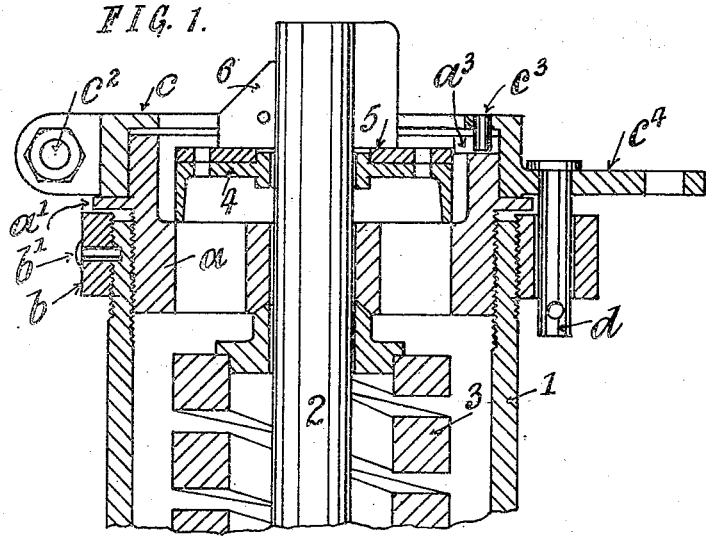
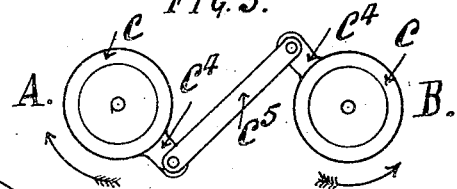
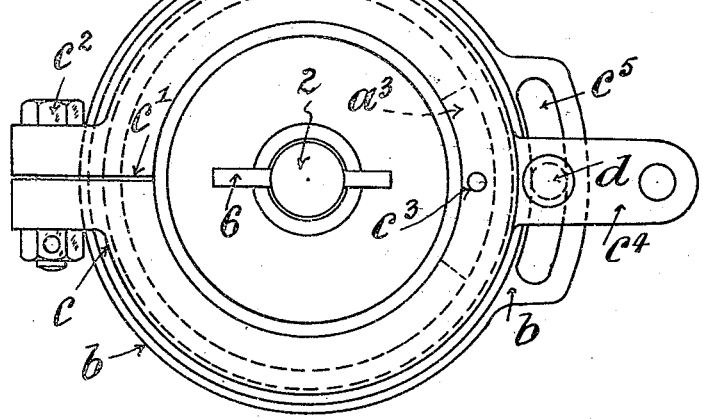
INVENTOR:
William Hargreaves
BY: Rueg, Boyne & Bakelar
ATTORNEYS Patented Sept. 15, 1931

1,823,651

UNITED STATES PATENT OFFICE

WILLIAM HARGREAVES, OF WEST DIDSBURY, MANCHESTER, ENGLAND, ASSIGNOR OF ONE-HALF TO R. L. ROSS AND COMPANY LIMITED, OF STOCKPORT, ENGLAND

SAFETY VALVE

Application filed November 5, 1929, Serial No. 404,927, and in Great Britain November 22, 1928.

This invention relates to safety valves for steam generators, or vessels under fluid pressure, and particularly to safety valves for locomotive boilers.

The objects in view are, first, to facilitate or simplify testing and exact setting of such valves in the actual manufacturing shop so that the valves can be issued to conform with a more or less dead test, second, to permit of and limit adjustment of unit valves up or down within strictly narrow limits by little skilled persons or of narrow relative adjustment in grouped and interconnected safety valves, and, thirdly, to permit of greater adjustment in such unit safety valves up or down (but still within limits) by an inspector or skilled official. All these objects can be readily accomplished with proper safeguards according to my invention.

The first object is desirable as it ensures facility as regards testing and setting on test, the second object is desirable to give some margin up or down in the unit or for groups of safety valve units interconnected after the fashion disclosed in patent specification 1,665,850, whilst the third object is a convenience which can with advantage be rendered available to an inspector who may have to deal with safety valves which have been repaired or re-assembled or subsequently tested with less skill and less perfect means than those at the disposal of the actual manufacturer.

The accompanying drawings show certain simple means by which the objects set forth and according to my invention can be achieved.

In these drawings:—

Fig. 1 is a sectional elevation of the upper half of one type of safety valve with certain suitable additional means appropriately combined.

Fig. 2 shows a plan view of Fig. 1.

Fig. 3 is a diagram indicating the coupling or cross-connection of two safety valves in parallel, each safety valve having combined with it mechanism akin to what is hereafter described.

To further ascertain the nature of my invention, I shall now describe simple means for my purpose and these in connection with the well known "Ross" type of safety valve, without in any way restricting my invention to safety valves of such type.

All valves of the "Ross" type have an exterior casing such as 1, a valve seat and valve (not shown), valve spindle 2, spring 3, etc., and it is very common to employ a secondary area or top cap such as 4 and a settable top plate 5. Then there is nut structure or sealed cotter 6 combined with the spindle. There is always some form of adjustable device or compression screw which regulates the compression on the contained spring.

I prefer to use an adjustable device $a$ with lower exterior screw thread which is screwed up or down in the upper end of the valve casing 1 to requirements at the test, and this is so constructed that part of its structure is exterior to the main casing at all times, so that this exterior part is readily accessible for adjustment up or down. There is an annular flange $a'$ or other abutment on the screw threaded adjustable device $a$ which works adjacent to a movable settable ring $b$ which for convenience can be applied on the screw threaded upper end of the exterior of the main casing 1. This settable ring $b$ can (after testing of the safety valve) be set, to resist the screw threaded adjustable device $a$ being further screwed down beyond what would for example put a further load of say 4 lbs. per square inch on the valve. This settable ring $b$ can be fixed (after adjustment) by a pin $b'$, spot welded in place, or by other safeguarding device.

As a result, no person can turn down the screw-threaded device $a$ from an approved setting to a greater extent than the 4 lbs.

I only intend a semi-skilled person to be able to turn down to the extent of say 2 lbs.

The protruding upper part of the screw-threaded adjustable device $a$ is fashioned to receive an annular cap $c$ which is like a split ring, being sawn through at $c'$. This annular cap $c$ can be clamped or fixed by a bolt $c^2$ or any equivalent device capable of receiving a seal. Said annular cap or split ring $c$ has a fixed or adjustable vertical pin $c^3$, the lower or inner extremity of which depends into a concealed segmental slot $a^3$ cut in the annular upper edge of the screw-threaded adjustable device $a$. Said annular cap or split ring $c$ has also, a horizontal or other lever extension $c^4$ for manual operation (or for coupling to a similar lever extension of another kindred safety valve when unit safety valves are cross-connected according to Patent No. 1,665,850) and from this lever extension I arrange a bolt or stud $d$ which fits a curved slot $c^5$ in an extension from the settable ring $b$. The slot could be in the lever extension. This bolt or stud $d$ has its lower end sealed to prevent withdrawal or tampering. The slot $c^5$ is of such dimensions that it only permits the bolt or stud $d$ to move to such an amount as allows the screw-threaded adjustable device $a$ to be moved over a range of say 4 lbs., i. e. say 2 lbs. up and 2 lbs. down. As a consequence, when the complete safety valve is tested, sealed-up and mounted, the semi-skilled person can only effect an adjustment of say 4 lbs. in total as a maximum, or cross-connected valves working in parallel can only be relatively adjusted to that extent.

But, for the highly skilled person, he may be authorized to break the seal of the bolt $c^2$ for the annular cap or split ring $c$ and slacken such bolt back. This frees the screw-threaded adjustable device $a$ and allows same to be turned by any tool or provided means to the extent of the concealed segmental slot $a^3$. Such concealed segmental slot $a^3$ may be such size as will permit the screw-threaded adjustable device $a$ to be turned to an extent of say 8 lbs., that is, 4 lbs. up and 4 lbs. down.

Thus, the range of adjustment available to the skilled person can be much greater than to the semi-skilled. The number of lbs. of adjustment permissible up or down is obviously variable in either case.

The construction or means can be much varied, so long as I combine with the head of the safety valve casing externally operated mechanism which permits a semi-skilled adjustment or of cross-connection of safety valves working in parallel, along with greater latitude of adjustment available (on the breaking of a seal) to the skilled official.

Whilst only an inspector may use the permissible "major" adjustment of the adjustable device to the maximum, the "minor" adjustment or change by the semi-skilled person is always available both up and down. As a safeguard I may make particular provision to check a "major" adjustment of the adjustable device in either of its two extreme positions at points which still permit the "minor" adjustment up or down to be made by the semi-skilled person once the cap or split ring is again clamped up and sealed.

I may graduate any of the moving parts for indicating purposes.

A very important feature of the invention is to provide an external locked-up "major" adjustment for the skilled, and a combined controlled and "minor" adjustment for slight variation of setting and operable by the semi-skilled, or for group safety valve coupling purposes.

In the general arrangement suggested, it is possible to get the "major" adjustment without having to use any tool with the screw-threaded adjustable device, because, when the inspector breaks the seal or bolt $c^2$ and releases the annular cap or split ring $c$, the same is free on its bearing on the screw-threaded adjustable device $a$ and can be manipulated. Being free, the lever extension can be moved angularly a limited distance in either direction as may be required and the limit stud set back in the slot. This done, the annular cap or split ring can be temporarily fastened up again, and so the lever extension can make say double the movement on actuation, thus enabling the inspector to operate the screw-threaded adjustable device $a$ an augmented distance without the use of any special tools. Before the inspector finally locks-up the annular cap or split ring $c$, he sees the setting is such as will only permit the semi-skilled to effect the "minor" adjustment or movement.

The diagram Fig. 3 is intended to indicate two adjustable safety valves of the character above set forth and cross-connected or coupled on the system according to my United States Patent No. 1,665,850, it being apparent that the two safety valves A and B can be made with screw threads of the same hand and have their lever arm extremities $c^4$, $c^4$ coupled by the connecting rod $c^5$ whereby, as the connecting rod $c^5$ is actuated in one direction or the other, the relative setting of the two safety valves is effected from time to time all as is set forth in the said Patent No. 1,665,850.

I declare that what I claim is:—

1. An adjustment mechanism for safety valves, comprising in combination, a valve casing, a valve-tension-spring in said casing, means for effecting a minor change in the tension of the spring, means for limiting said tension-changing means within predetermined limits, normally inoperative means associated with said tension-changing means and disposed within the casing for effecting a further change of tension within predetermined limits, and means permitting access to said normally inoperative means to enable said further change of tension to be effected but still within predetermined limits.

2. An adjustment mechanism for safety valves, comprising in combination, a valve casing, a valve-tension-spring in said casing, a member threaded in said casing and adapted to maintain said spring at a predetermined tension, a member adjustable on the outside of the casing, means for securing said adjustable member in fixed position, means carried by the tension-maintaining member and adapted to contact with said outside member for limiting the movement of the tension-maintaining member in one direction, means releasably secured to the tension-maintaining member for actuating the same, and cooperating means carried by said tension-maintaining member and said outside member for limiting the movement of said actuating means.

3. An adjustment mechanism for safety valves, comprising a casing, a settable device thereon, means for securing said settable device in fixed position on the casing, a sleeve threaded into the casing and having an abutment adapted to engage said settable device thereby to limit movement of the sleeve in one direction, a split ring releasably secured to the sleeve for rotating the latter, said ring having a lateral extension for actuating the ring, cooperating means carried by said extension and said settable device for limiting the actuation of the ring, said sleeve being independently movable when the split ring is released, and cooperating means carried by the ring and sleeve for limiting said independent movement.

4. An adjustment mechanism for safety valves, comprising a casing, a settable device thereon, means for securing said settable device in fixed position on the casing, a sleeve threaded into the casing and having an abutment adapted to engage said settable device thereby to limit movement of the sleeve in one direction, a rotatable cap mounted on the sleeve, releasable means for securing the cap and sleeve for rotation together, means for actuating said cap, cooperating means carried by said cap and settable device for limiting the action of said actuating means within predetermined limits, the sleeve being rotatable independently when the cap-securing means is released, and cooperating means carried by the cap and sleeve for limiting said independent rotation.

5. An adjustment mechanism for safety valves, comprising a casing, a settable device thereon, means for securing said settable device in fixed position on the casing, a sleeve threaded into the casing and having an abutment adapted to engage said settable device thereby to limit movement of the sleeve in one direction, a rotatable cap mounted on the sleeve, releasable means for securing the cap and sleeve for rotation together, a lateral extension carried by said cap-securing means for rotating the cap, a pin and slot connection between said lever and said settable device for limiting the rotation of the cap, said sleeve being rotatable independently of the cap when the securing means is released, and a pin and slot connection between the cap and sleeve for limiting said independent rotation.

In testimony whereof I have signed my name to this specification.

WILLIAM HARGREAVES.